United States Patent [19]

Takigawa et al.

[11] Patent Number: 4,774,470

[45] Date of Patent: Sep. 27, 1988

[54] SHIELD TUNNELING SYSTEM CAPABLE OF ELECTROMAGNETICALLY DETECTING AND DISPLAYING CONDITIONS OF GROUND THEREAROUND

[75] Inventors: Takamura Takigawa, Kojima; Kazuaki Ezawa, Tokorozawa, both of Japan

[73] Assignee: Mitsui Engineering & Shipbuilding Co., Ltd., Tokyo, Japan

[21] Appl. No.: 846,238

[22] Filed: Mar. 31, 1986

[30] Foreign Application Priority Data

Sep. 19, 1985 [JP] Japan .................. 142006[U]

[51] Int. Cl.⁴ .................. G01V 3/12; G01V 3/34; E21D 9/10; E21B 47/00
[52] U.S. Cl. ...................... 324/337; 175/50; 299/1; 324/500
[58] Field of Search .............. 324/337, 338, 219–221, 324/58 B, 58.5 B; 175/40, 50; 299/1; 342/118, 458

[56] References Cited

U.S. PATENT DOCUMENTS

| | | | |
|---|---|---|---|
| 2,940,302 | 6/1960 | Scherbatskoy | 324/220 X |
| 3,064,127 | 11/1962 | Green et al. | 324/220 X |
| 3,238,448 | 3/1966 | Wood et al. | 324/220 |
| 4,167,290 | 9/1979 | Yamazaki et al. | 175/50 X |
| 4,297,699 | 10/1981 | Fowler et al. | 324/338 X |
| 4,383,220 | 5/1983 | Baldwin | 324/338 |
| 4,511,842 | 4/1985 | Moran et al. | 324/338 |
| 4,560,931 | 12/1985 | Murakami et al. | 324/220 |

FOREIGN PATENT DOCUMENTS

| | | | |
|---|---|---|---|
| 0026256 | 2/1983 | Japan | 324/220 |
| 18199 | 10/1983 | Japan | |

Primary Examiner—Gerard R. Strecker
Attorney, Agent, or Firm—Charles E. Pfund

[57] ABSTRACT

In a shield machine, there are provided an electromagnetic wave transmitting and receiving unit mounted on the top of the shield machine for radiating electromagnetic impulse wave toward an underground and for receiving the electromagnetic wave reflected from the underground, and a position sensor for collecting an information regarding the position of the electromagnetic wave transmitter and receiver unit. Data processing unit is provided for processing the signals from transmitter/receiver and the position sensor and sent through a transmission line. The data processing unit continuously displays the condition of the underground at the cutting face.

8 Claims, 4 Drawing Sheets

SHIELD TUNNELING SYSTEM CAPABLE OF ELECTROMAGNETICALLY DETECTING AND DISPLAYING CONDITIONS OF GROUND THEREAROUND

BACKGROUND OF THE INVENTION

This invention relates to a shield tunnelling system capable of electromagnetically detecting conditions of ground near a cutter head of a shield tunneling machine.

Shield tunneling machines are utilized for constructions of underground facilities, e.g., railways, highways, water-works, sewers, power supply, etc., and are generally classified into open-faced and closed-face types mainly according to whether an operator of the shield tunneling machine is able to watch a cutting face by sight, or not.

One important factor necessary in shield tunneling is to stabilize the cutting face. Especially while excavating under special working conditions, such as in a sand layer having a small uniform coefficient or a lamination of certain number of layers having different properties, the ground near the cutting face is liable to collapse. Since cave-ins formed as a result of collapse should be filled with a filling material for preventing a local sinking of the ground surface, it is important to detect the collapse immediately and continuously.

Compared with the open-face shield tunneling machine, the closed-face shield tunneling machine has a higher degree of the cutting face stability but has the disadvantage in that the operator thereof is unable to measure the collapse of the ground by sight.

A method for detecting or supervising the existence of the cave-ins near the cutting face by using electromagnetic impulse is disclosed in Japanese Laid Open Patent Specification No. 18199 of 1983. According to this method, the electromagnetic impulse is radiated from a transmitter antenna installed on the top of the skin plate of the shield tunneling machine and some of the electromagnetic wave energy is reflected at the interface between materials of different electrical properties and is received by a receiver antenna so as to detect the condition of the cutting face or especially the existence of the the cave-ins based on the wave shape and intensity of the received electromagnetic waves thereby confirming cave-ins of the ground and the range of the earth loosening caused by the collapse. However, it has been impossible to correctly know the size and shape of the cave-ins and the degree of loosening. Furthermore, no practical method has been available for mounting the transmitter and receiver antenna on the shield tunneling machine.

SUMMARY OF THE INVENTION

One object of this invention is to provide a novel shield tunneling system capable of immediately and continuously detecting, measuring and displaying the ground condition near the cutting face worked by a shield tunneling machine.

Another object of this invention is to provide an efficient structure for mounting the antenna on the skin plate of the shield tunneling machine.

The shield tunneling system capable of electro-magnetically detecting and displaying conditions of ground therearound according to the present invention comprises: a shield tunneling machine provided with a rotary cutter head disposed at a front end thereof and rotating about an axis directed in a forwarding direction of the shield tunneling machine for excavating the ground therebefore to construct a tunnel, and a skin plate connected to the rotary cutter head for covering a space formed between the cutter head and the front ends of shield segments S which are ring shaped, respectively, and progressively constructed on an inner surface of the tunnel excavated; an electromagnetic wave transmitter/receiver mounted on an outside portion of the shield tunneling machine for radiating an electromagnetic impulse toward the ground near the cutter head and for receiving the electromagnetic impulse reflected from the ground; a position sensor mounted on the shield tunneling machine for collecting an information regarding a position of the electromagnetic transmitter/receiver in a predetermined reference direction in the tunnel; a signal pre-processor located inside of the shield tunneling machine and connected with the electromagnetic wave transmitter/receiver and the position sensor for performing a pre-processing including noise reduction and smoothing of the reflected signal to output a signal representing the position of the electromagnetic transmitter/receiver in the tunnel and the condition of the ground near the cutter head at positions in the tunnel corresponding to the respective positions of the electromagnetic transmitter/receiver; and a data processor located inside or outside of the tunnel and operably connected to the signal pre-processor by a communication cable, for processing the pre-processed signal from the signal pre-processor, and providing continuously and in real time a two-dimiensional graph representing time to time relationship between the condition of the ground near the cutter head and the position of the cutter head.

DETAILED DESCRIPTION OF THE PREFERRED EMBODIMENT

Figure 1:
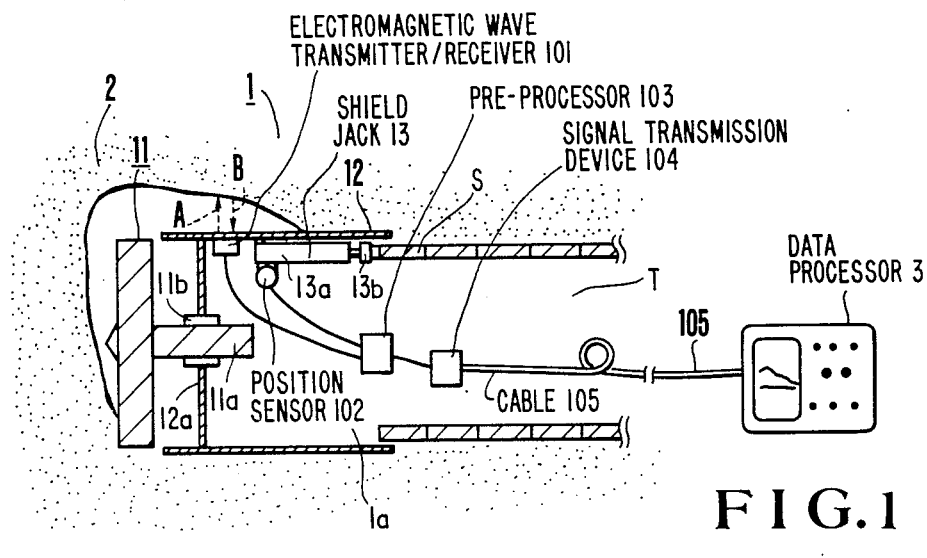
FIG. 1 is a longitudinal section showing a schematic drawing of this invention.

A shield tunneling machine 1 shown in FIG. 1 excavates the ground 2 forward, i.e., toward the left in the drawing, thereby to construct a tunnel T. Inner surface of the tunnel T is progressively provided with shield segments S. It constitutes a rotary cutter head 11, a skin plate 12, and shield jacks 13.

The rotary cutter head 11 rotates together with the rotating shaft 11a which is directed in the forwarding direction of the shield tunneling machine 1. The skin plate 12 is constructed so as to cover a space formed between the rotary cutter head 11 and a front end of the shield segments S. A front portion of the skin plate 12 is formed to be a bulkhead 12a separating the cutter head 11 from the inner space 1a of the shield tunneling machine 1. The rotation shaft 11a of the cutter head 11 penetrates a center of the bulkhead 12a which is secured to a bearing member 11b of the rotating shaft 11a. According to the above-described construction of the shield tunneling machine 1, the skin plate 12 advances together with the cutter head 11. The shield jack 13 is capable of extension and retraction and has a front portion 13a fixed to the skin plate 12 and a rear portion 13b which is in contact with a front end portion of the shield segment S during an extension stroke of the shield jack 13 and becomes free during a retracting stroke of the shield jack 13, thereby to move the shield tunneling machine 1 in a following manner. Before the shield tunneling machine 1 is started to move, the shield jack 13 is retracted completely, i.e., has shortest length, and the rear face of the rear portion 13b of the shield jack 13 is brought into contact with a front face of the newly fitted shield segment S. Under this condition, the cutter head 11 is rotated and the shield jack 13 is energized to extend. Since the shield segment S is fixed to the inner surface of the tunnel T, the front portion 13a of the shield jack must be moved forward. FIG. 1 shows the shield jack 13 at a time a little after the start of the shield tunneling machine 1. The shield jack 13 is designed so that a single stroke or maximum extension length thereof is little larger than the width of the single shield segment S. Therefore, the shield tunneling machine 1 stops after the shield 13 extends to its maximum length, thereby, to complete a single stroke of the shield tunneling machine 1. Then, the shield jack is retracted to its shortest length. The vacant space between the rear portion 13b of the shield jack 13 and the front face of the shield segment S is immediately filled by fitting a new additional shield segment S, therein to cause the rear portion 13b of the shield jack 13 to be attached to a front face of the new shield segment S. Then, the shield jack 13 is energized to start the next stroke of the shield tunneling machine 1. Thus, the shield tunnel T is constructed step by step by repeating the process described above.

An electromagnetic wave transmitter/receiver 101 transmitting the electromagnetic impulses toward the surrounding ground 2 is mounted on the skin plate 12. A position sensor 102 collecting traveling distance information of the electromagnetic wave transmitter/receiver 101 is mounted on the front portion 13a of the shield jack 13. The position sensor 102 is constituted of, for example, a rotary encoder rotated about an axis for converting a rotational angle thereof to an electrical quantity, the rotary encoder including a pulse generator for generating a sampling pulse signal every predetermined unit rotation angle of the rotary encoder, a reel which has an axis connected with the axis of the rotary encoder and causes the rotary encoder to rotate when it is rotated, a wire having one end fixed to a peripheral portion of the reel and the other end adapted for connection to an object, and a spring for usually energizing the reel to rotate in such rotational direction that the wire is rolled around the reel.

When the position sensor 102 is moved while the object is fixed, or the object is moved while the position sensor 102 is fixed, the wire is pulled and rolled out, the reel is rotated against the force of the spring, and, accordingly, the rotary encoder rotates. The pulse generator of the rotary encoder generates the sampling pulse signal every time the wire extends by a unit length corresponding to the afore-mentioned predetermined unit rotation angle of the rotary encoder.

By using the position sensor described above, the position of the moving position sensor itself with reference to the stable object can be determined.

The wire-type position sensor described above is well known. Another type of position sensor having a pinion fixed to the axis of the rotary encoder, a rack in mesh with the pinion, and a rod integrated with one end portion of the rack, can be used as the position sensor 102.

Figure 2:
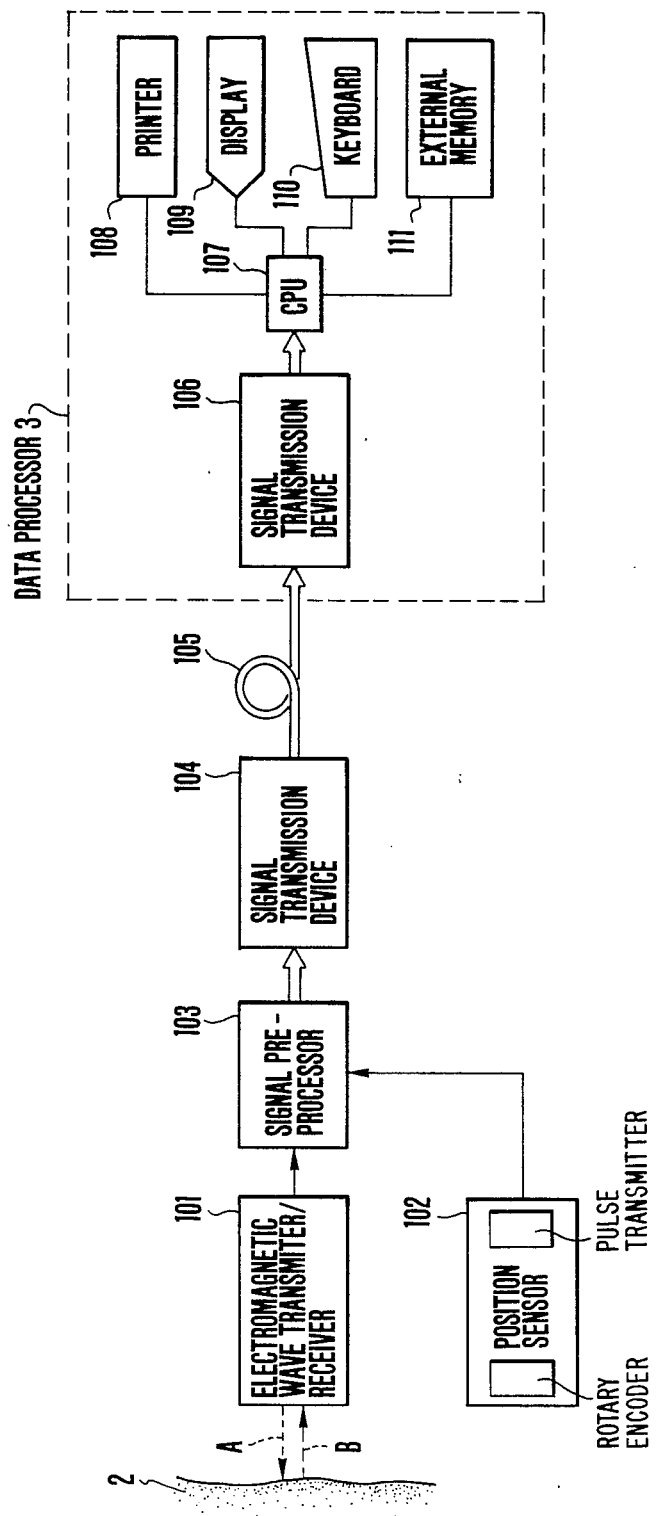
FIG. 2 is a flow chart of the electric system employed in the schematic drawing in FIG. 1.

In the embodiment shown in FIG. 1, the position sensor 102 is mounted on the front portion 13a of the shield 13, and the other end of the wire (not shown) of the position sensor 102 is connected with the wire portion 13b of the shield jack 13. When the cutter head moves forward, the skin plate 12, the front portion 13a of the shield jack 13, and, accordingly, the electromagnetic wave transmitter/receiver 101 move forward by same distance as the rotary cutter head 11 advances, resulting in that the rotary encoder of the position sensor 102 is rotated by an angle corresponding to the travelling distance of the electromagnetic wave transmitter/receiver 101. The electromagnetic wave transmitter/receiver 101 and the position sensor 102 are connected to a signal preprocessor 103 installed at a suitable position inside of the shielf tunneling machine 1 or the tunnel. The signal preprocessor 103 is connected to a signal transmission device 104 which is connected to a data processor 3 positioned inside or outside the tunnel and linked by a cable 105. The electromagnetic wave transmitter receiver 101, the position sensor 102, the signal preprocessor 103, the signal transmission device 104, the cable 105 and a data processor 3 constitue the device of this invention for detecting and displaying ground conditions near the center head 11 of the shield tunneling machine, and the flow chart of the apparatus is shown in FIG. 2.

More particularly, the electromagnetic impulse A radiated by the transmitter antenna of the electromagnetic wave transmitter/receiver 101 is reflected to form a reflected impulse B representing the condition of the ground 2 near the cutter head, the reflected impulse B being received by a receiver through a receiver antenna. The output of the receiver is sent to the signal preprocessor 103. On the other hand, as the excavating operation proceeds, the position sensor 102 collects from time to time a signal representing the traveling distance of the electromagnetic impulse transmitter/receiver 101, as described above, and the collected signal is sent to the signal preprocessor 103. The signal preprocessor 103 samples the reflected impulse received from the electromagnetic wave transmitter/receiver 101 in accordance with the sampling pulse signal from the position sensor 102, reduces noise included in the received signal, and then outputs a signal representing the condition of the ground to which the electromagnetic impulse is radiated from the electromagnetic wave transmitter/receiver 101.

As well known, the electromagnetic impulse is reflected by targets existing on the travelling path thereof. Since the propagation speed of the electromagnetic wave through the ground is known, the distances from the electromagnetic wave transmitter/receiver 101 to the targets are determined by measuring the time intervals between the time at which the electromagnetic impulse is radiated from the electromagnetic wave transmitter/receiver 101 and the times at which the reflected signals from the respective targets are received.

The electromagnetic impulse radiated from the electromagnetic wave transmitter/receiver 101 to the ground is reflected first from the surface of the ground, and, then, travels through the ground while it attenuates rapidly. Accordingly, a strong signal received at first after the electromagnetic impulse is radiated represents the surface of the ground or cave-in. If there exists a target, e.g., metallic pipe, big and hard rock or etc., on the travelling path of the electromagnetic impulse in the ground, such a target also can be detected since the received signal indicates a relatively large amplitude at the time corresponding to the distance or range of the target from the electromagnetic wave transmitter/receiver 101.

Since the moving speed of the transmitter/receiver 101 is very small in comparison with the propagation speed of the electromagnetic impulse, it can be assumed that the electromagnetic wave transmitter/receiver 101 is substantially stopped during the time interval over which the electromagnetic impulse travels twice the range which is being determined.

In other words, the sampling pulse signals are supplied from the position sensor 102 to the preprocessor 103 at time intervals which are larger than twice the ranges being determined to the signal transmission device 104. The signal transmission device 104 comprises a transmitting and receiving circuit which amplifies and modulates the converted signal, and sends the modulated signal to the data processor 3 positioned inside or outside of the tunnel through cable 105.

FIG. 2 shows in detail the flow chart of the data processor 3. Thus, the signal transmitted through the cable 105 is received by a signal transmission device 106 which is same as the device 104 and then supplied to a central processing unit (CPU) 107. The CPU 107 is constituted by a microcomputer, for example, for calculating various necessary information according to a program predetermined based on the signals representing the ground condition and the position of the electromagnetic wave transmitted/receive 101. In response to an instruction from a keyboard 110, the CPU 107 sends various output data to a printer 108, a display device 109 and an external memory 111.

Figure 3:
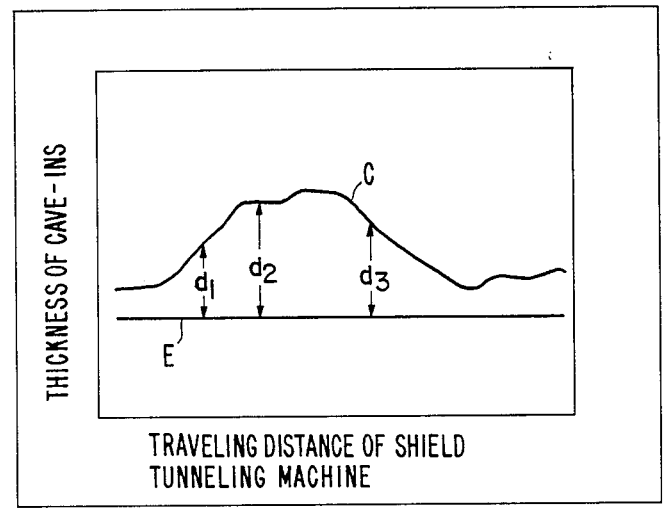
FIG. 3 is a graph showing the extent of a cave-in detected by the device depicted in FIG. 1.

FIG. 3 shows one example of the displayed information respresented by a two-dimensional graph in which the abscissa represents the position or the advanced distance of the shield tunneling machine 1 and the ordinate the distance between the top surface of the shield tunneling machine 1 and the faces of cave-ins. In FIG. 3, line E represents the surface of the shield tunneling machine 1 and curve C represents a face of cave-in. The thicknesses, for example, $d_1$, $d_2$ and $d_3$ between the face of the cave-in and the surface (line E) of the shield tunneling machine 1 are obtained by measuring the time intervals from radiation of the electromagnetic impulse to reception of the first strong reflected signal, respectively.

Figure 4:
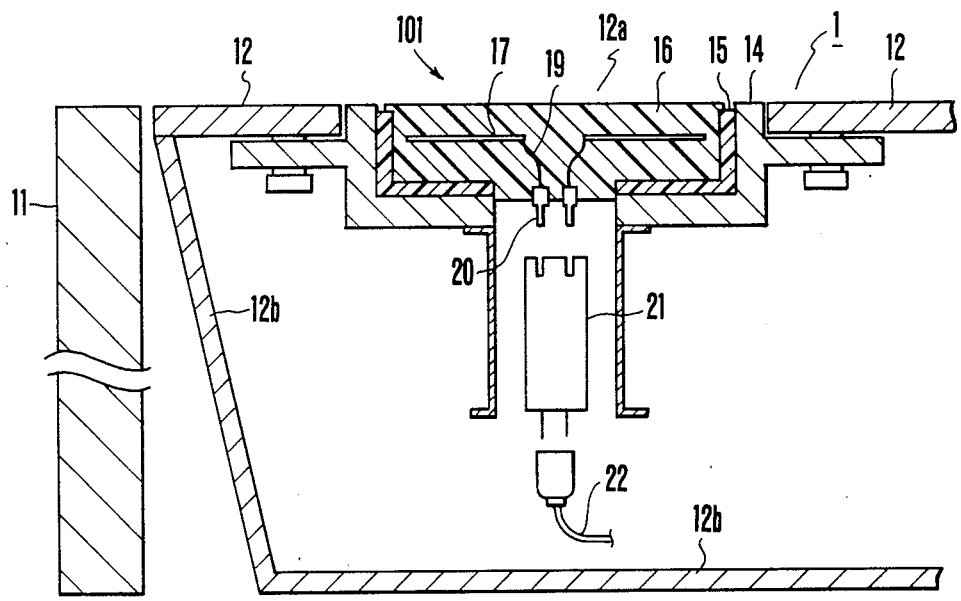
FIG. 4 is a sectional view showing one example of a structure for mounting the antenna shown in FIG. 1.

FIG. 4 illustrates one example of a mounting structure utilized for mounting the electromagnetic impulse transmitter/receiver 101 on the skin plate 12. As shown, an opening 12a having a predetermined diameter is formed through a portion near the front end of the skin plate 12 for receiving a casing 14. The casing 14 takes the form of a cup having an outer diameter substantially equal to the inner diameter of the opening 12a and is secured to the skin plate 12 with its recess faced to the ground 2. An electromagnetic wave absorbing layer 15 made of ferrite, for example, is bonded to the entire inner surface of the casing 14. Furthermore, the recess is filled with substance 16, for example FRP, which does not absorb electromagnetic wave. The upper surface of substance 16 is flat with the upper surfaces of the casing 14 and the skin plate 12. The substance 16 securely holds antenna 17 connected to connectors 20 through lead wires 19. A transmitter/receiver circuit 21 is located beneath the casing 14 and connected to the antenna 17 through the connectors 20. The numeral 22 denotes source lines and signal lines. The casing 14, transmitter/receiver circuit 21, etc. are covered by a protective cover plate 12b.

With this construction, the antenna 17 is protected against an external pressure applied by the ground 2 by means of the substance 16. Moreover, since the antenna is supported by casing 14, a sufficient durability against the external pressure can be ensured. Although the electromagnetic impulse is propagated toward the ground 2 and through the inside of the shield tunneling machine 1, the latter electromagnetic wave is absorbed by an electromagnetic wave absorber 15. For this reason, the electromagnetic impulse is propagating toward the ground 2 through the substance 16 and then some of the impulse energy are reflected at the interface between the materials of different electrical properties to the antenna 17, thus making it possible to immediately and continously detect, measure and display the ground condition near the cutting face worked by the shield tunneling machine 1 and at an early stage to take some remedial action, for example to grout mortar into the cave-ins.

Figure 5:
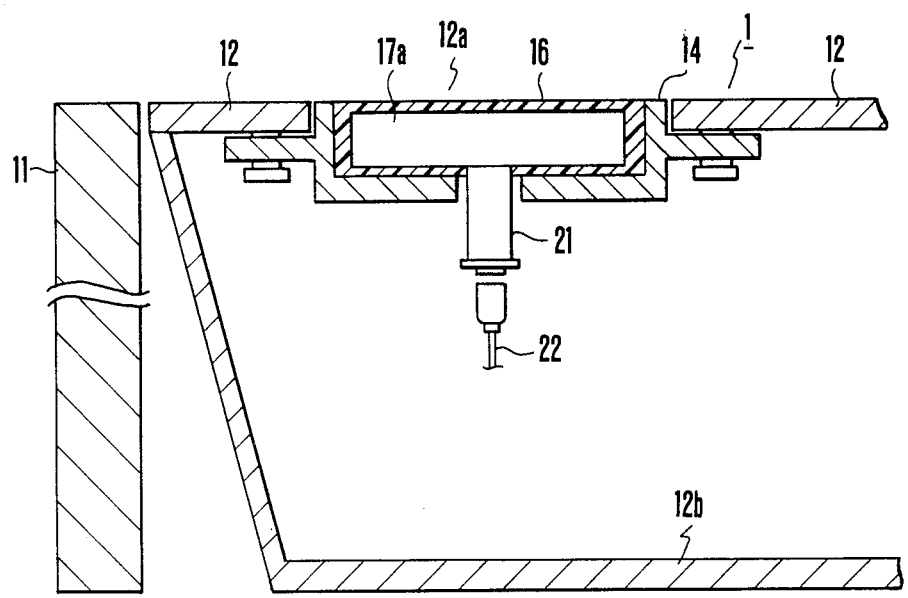
FIG. 5 is a sectional view showing another example of the antenna mounting structure.

In a modification shown in FIG. 5, an antenna, with an electromagnetic wave absorber, now shown, encapsulated in a casing 17a is secured to the casing 14 with the substance 16. With this construction, it is easier to mount the antenna than the construction shown in FIG. 4.

Figure 6:
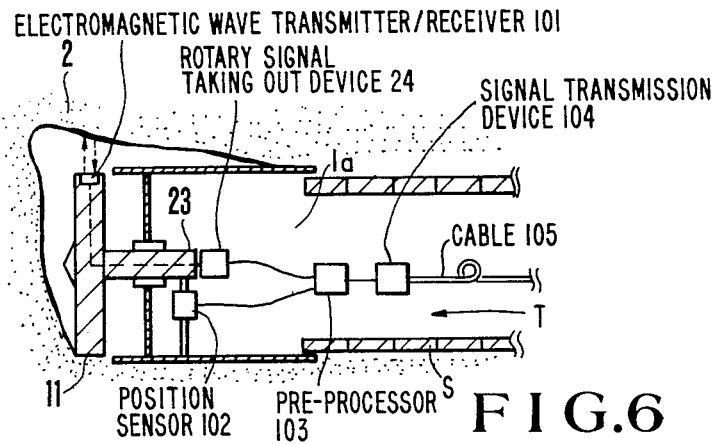
FIG. 6 is a schematic longitudinal section showing another embodiment of this invention.

FIG. 6 shows still another embodiment of the invention in which elements identical to those shown in FIG. 1 are designated by the same reference numerals.

In this embodiment, the electromagnetic wave transmitter/receiver 101 is secured to the periphery of the cutter head 11. An antenna mounting structure identical to that shown in FIG. 4 or FIG. 5 can be used. A position sensor 102 is secured to a shaft 23 for driving the cutter head 11 so as to detect the rotational position of the shaft 23. The signal output from the electromagnetic wave transmitter/receiver 101 is derived out through a rotary signal taking out device 24.

Figure 7:
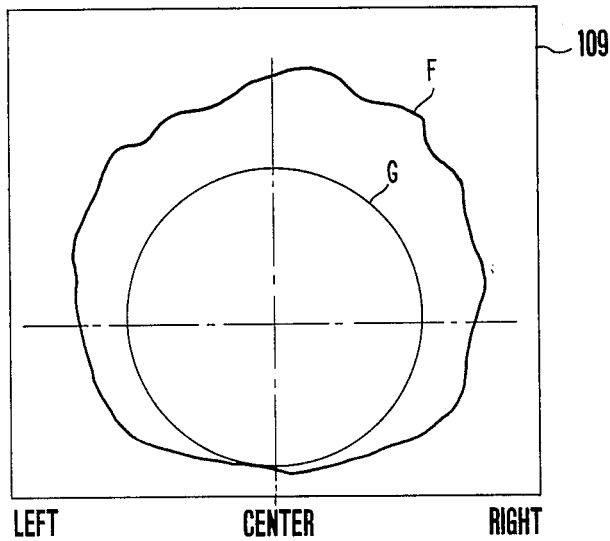
FIG. 7 is a graph showing an example of the display of the underground condition detected by the device depicted in FIG. 6

FIG. 7 shows one example of a displayed pattern showing the cross-section of the face of cave-ins around the cutter head of the shield tunneling machine shown in FIG. 6. In FIG. 7, a circle G represents the periphery of the cutter head 11 and a curve F represents the faces of the cave-ins.

Figure 8:
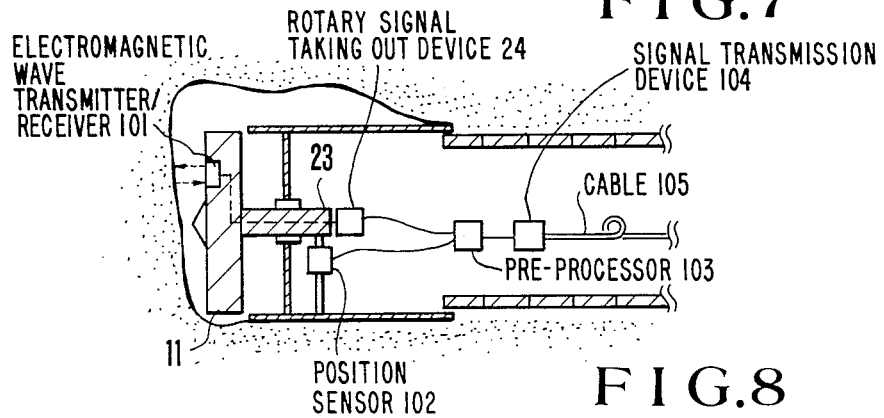
FIG. 8 is a third longitudinal section showing still another embodiment of this invention.

FIG. 8 illustrates still another embodiment of this invention in which the electromagnetic wave transmitter/receiver 101 is mounted on the front surface of the cutter head 11 by the mounting structure similar to those of previous embodiments. Other elements shown in FIG. 8 are identical to those shown in FIG. 6.

What is claimed is:

1. A shield tunneling system capable of electromagnetically detecting and displaying conditions of ground therearound comprising:

a shield tunneling machine provided with a rotary cutter head disposed at a front end thereof and rotating about an axis directed in a forwarding direction of said shield tunneling machine for excavating the ground therebefore to construct a tunnel, and a skin plate connected to said rotary cutter head for covering a space formed between said cutter head and a front end of shield segments which are progressively constructed on an inner surface of the tunnel excavated;

an electromagnetic wave transmitter/receiver mounted on an outside portion of said shield tunnelling machine for radiating an electromagnetic impulse toward the ground near said cutter head and for receiving the electromagnetic impulse reflected from the ground;

a position sensor mounted on said shield tunneling machine for detecting a distance by which said electromagnetic transitter/receiver moves from a reference point in a predetermined reference direction in said tunnel and outputting a sampling pulse signal representing a sampling time at which the electromagnetic impulse reflected from the ground is to be sampled;

a signal pre-processor located inside of said shield tunneling machine and connected with said electromagnetic wave transmitter/receiver and said position sensor for sampling the electromagnetic impulse reflected from the ground in response to said sampling pulse signal outputted from said position sensor and performing a pre-processing including noise reduction and smoothing of the reflected impulse to output a signal representing the condition of the ground from which the electromagnetic impulse is reflected at said sampling time; and a data processor located inside or outside of the tunnel and operably connected to said signal pre-processor by a communication cable, for processing the pre-processed signal from said signal pre-processor, and displaying continuously and in real time a two-dimensional graph representing a vertical cross-sectional view of the ground near the cutter head.

2. The shield tunneling system according to claim 1 wherein said electromagnetic transmitter/receiver is mounted in a recessed casing on said outside portion of said shield tunneling machine and further including a layer of electromagnetic wave absorbing material positioned on a bottom surface of the casing.

3. The shield tunneling system according to claim 1, wherein the signal pre-processor comprises a cable.

4. The device according to claim 3, wherein the cable comprises an optical fiber.

5. The shield tunneling system according to calim 1, wherein the data processor comprises a computer, display, a printer, external memory and a keyboard.

6. The shield tunneling system according to claim 1, wherein said shield tunneling machine is equipped with jack means having a front portion fixed to said skin plate and a rear portion not fixed, a distance between the front and rear portions being variable, said jack means causing said shield tunneling machine to move when said jack means extends while the rear portion thereof is maintained in contact with the front end of said shield segments, said electromagnetic wave transmitter/receiver are mounted on said skin plate, said position sensor is connected to said jack means so as to output a signal representing the distance between the front and rear portions of said jack means for detecting the traveling distance of said shield tunneling machine, and said data processor comprises means for displaying continuously in real time a two-dimensional graph representing the vertical cross-sectional view of the ground near the cutting face along the advancing direction of said shield tunneling machine.

7. The shield tunneling system according to claim 1, wherein said electromagnetic wave transmitter/receiver is mounted on a front surface or a periphery of said rotary cutter head, said position sensor is connected to said shaft of said rotary cutter head to output a signal representing a rotation angle of said electromagnetic wave transmitter/receiver, and said data processor comprises means for displaying continuously in real time a two-dimensional graph representing the vertical cross-sectional view of the ground near the cutting face along the periphery of said rotary cutter head.

8. The shield tunneling system according to claim 6 or 7 wherein said electromagnetic wave transmitter/receiver is disposed in a recessed casing in the outside portion of said shield tunneling machine, and said recessed casing is filled with substance which does not absorb electromagnetic energy, a surface of the substance being flat with an outer surface of said recessed casing.

* * * * *